(12) United States Patent
Iwase et al.

(10) Patent No.: US 12,378,960 B2
(45) Date of Patent: Aug. 5, 2025

(54) ELECTRIC COMPRESSOR

(71) Applicant: KABUSHIKI KAISHA TOYOTA JIDOSHOKKI, Kariya (JP)

(72) Inventors: Yusuke Iwase, Kariya (JP); Hiroaki Ito, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 0 days.

(21) Appl. No.: 18/973,714

(22) Filed: Dec. 9, 2024

(65) Prior Publication Data

US 2025/0207586 A1    Jun. 26, 2025

(30) Foreign Application Priority Data

Dec. 21, 2023    (JP) ................. 2023-215885

(51) Int. Cl.
*F04C 18/02* (2006.01)
*H02K 5/04* (2006.01)
(Continued)

(52) U.S. Cl.
CPC ............ *F04C 18/0207* (2013.01); *H02K 5/04* (2013.01); *H02K 7/003* (2013.01); *H02K 7/14* (2013.01);
(Continued)

(58) Field of Classification Search
CPC .. F04C 18/0207; F04C 23/008; F04C 29/063; F04C 2240/30; F04C 2240/403; F04C 2240/803; F04C 2240/808; H02K 5/04; H02K 5/225; H02K 7/003; H02K 7/14; H02K 7/14322; H02K 7/1432; H02K 11/33; H02K 11/02; H02K 1/18; H02K 2201/10166; H02K 2201/10606; H02K 2201/10757; H02K 2201/10901;
(Continued)

(56) References Cited

U.S. PATENT DOCUMENTS 10,700,471 B2 *   6/2020   Rech .................. F04B 35/04
11,242,016 B2 *   2/2022   Toyoda .............. B60R 16/0222
(Continued)

FOREIGN PATENT DOCUMENTS

JP   2000-255252 A   9/2000
JP   2015-178806 A   10/2015

*Primary Examiner* — Dapinder Singh
(74) *Attorney, Agent, or Firm* — Sughrue Mion, PLLC

(57) ABSTRACT

An electric compressor comprising: a conductive pin; an inverter terminal; and an electrical connector. The electrical connector includes: a bus bar; a first terminal and a second terminal at opposite ends of the bus bar; and an accommodation case fixed to a motor housing. The first terminal is connected to the conductive pin outside the motor housing. The second terminal is inserted into an inverter housing. The accommodation case has a second through hole through which the conductive pin is inserted toward the first terminal and accommodates the bus bar such that the second terminal is disposed outside the accommodation case. A junction terminal connects the inverter terminal and the second terminal inside the inverter housing. The first terminal and the second terminal are respectively fitted into the conductive pin and the junction terminal by movement of the electrical connector in an axial direction of a rotary shaft.

5 Claims, 8 Drawing Sheets

(51) Int. Cl.
*H02K 7/00* (2006.01)
*H02K 7/14* (2006.01)

(52) U.S. Cl.
CPC .... *F04C 2240/30* (2013.01); *F04C 2240/403* (2013.01)

(58) Field of Classification Search
CPC .......... H02K 2201/10378; H02K 2201/10522; H02K 2201/10568; F04B 35/04; F04B 39/121
See application file for complete search history.

(56) References Cited

U.S. PATENT DOCUMENTS

| | | | |
|---|---|---|---|
| 11,936,251 B2* | 3/2024 | Kobayashi | H03H 1/0007 |
| 2011/0175470 A1* | 7/2011 | Kinoshita | F04B 39/12 |
| | | | 310/71 |
| 2013/0049550 A1* | 2/2013 | Watanabe | F04B 39/121 |
| | | | 310/67 R |
| 2015/0295532 A1* | 10/2015 | Sakai | F04C 28/06 |
| | | | 318/472 |
| 2016/0327316 A1 | 11/2016 | Hattori et al. | |
| 2019/0052070 A1* | 2/2019 | Hattori | H01R 4/308 |

* cited by examiner

ELECTRIC COMPRESSOR

CROSS-REFERENCE TO RELATED APPLICATION

This application claims priority to Japanese Patent Application No. 2023-215885 filed on Dec. 21, 2023, the entire disclosure of which is incorporated herein by reference.

The present disclosure relates to an electric compressor.

BACKGROUND ART

Japanese Patent Application Publication No. 2000-255252 discloses an example of a known electric compressor. This exemplified electric compressor includes a compression unit, a motor, an inverter, and a housing.

The compression unit is configured to compress a fluid by rotation of a rotary shaft. The motor is configured to rotate the rotary shaft. The inverter has an inverter circuit that drives the motor. The housing includes a motor housing and an inverter housing. The motor housing accommodates the motor. The inverter housing accommodates the inverter.

In the electric compressor, the inverter housing is disposed radially outside the motor housing, and the motor housing and the inverter housing are disposed side by side in the radial direction of the rotary shaft. This prevents an increase in the size of the electric compressor in the axial direction of the rotary shaft.

Furthermore, in the electric compressor, the motor housing includes a conductive pin electrically connected to the motor, and the inverter housing includes an inverter terminal electrically connected to the inverter circuit. The conductive pin and the inverter terminal are connected by a conductor, such as a lead wire or a bus bar.

However, in this known electric compressor, the conductor is connected to the conductive pin and the inverter terminal by welding or screw fastening, which deteriorates assembly workability.

The present disclosure, which has been made in light of the above-mentioned problem, is directed to providing an electric compressor that allows an improvement in assembly workability.

SUMMARY

In accordance with an aspect of the present disclosure, there is provided an electric compressor comprising: a rotary shaft; a compression unit; a motor configured to rotate the rotary shaft; an inverter including an inverter circuit that drives the motor; an inverter housing accommodating the inverter; a motor housing; a compression unit housing having a bottomed-cylindrical shape and accommodating the compression unit; a shaft support member; a conductive pin; an inverter terminal; and an electrical connector. The compression unit is configured to compress a fluid with rotation of the rotary shaft. The motor housing has a bottomed-cylindrical shape and accommodates the motor. The motor housing cooperates with the inverter housing to define, radially outside the motor housing, an inverter chamber in which the inverter is accommodated. The shaft support member is disposed between the motor housing and the compression unit housing. The shaft support member cooperates with the motor housing to define a motor chamber in which the motor is accommodated and cooperates with the compression unit housing to define a compression unit chamber in which the compression unit is accommodated. The shaft support member has an insertion hole through which the rotary shaft is inserted. The shaft support member supports the rotary shaft rotatably. The conductive pin is inserted through a first through hole formed through a bottom wall of the motor housing. The conductive pin is held by the first through hole and electrically connected to the motor. The inverter terminal has a plate shape, is disposed in the inverter housing, and is electrically connected to a board of the inverter circuit on which a pattern is formed. The electrical connector electrically connects the conductive pin and the inverter terminal. The electrical connector includes: a bus bar having a plate shape; a first terminal and a second terminal respectively at opposite ends of the bus bar; and an accommodation case fixed to the bottom wall of the motor housing. The first terminal is connected to the conductive pin outside the motor housing. The second terminal is inserted into the inverter housing. The accommodation case has a second through hole through which the conductive pin is inserted toward the first terminal and accommodates the bus bar such that the second terminal is disposed outside the accommodation case. A junction terminal is disposed on the inverter terminal and connects the inverter terminal and the second terminal inside the inverter housing. The first terminal and the second terminal are respectively fitted into the conductive pin and the junction terminal by movement of the electrical connector in an axial direction of the rotary shaft.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an embodiment of the present disclosure in detail with reference to the accompanying drawings. An electric compressor according to the embodiment (hereinafter simply referred to as a compressor 20) is, specifically, an electric scroll compressor. The compressor 20 is mounted on a vehicle (not illustrated) and is applied to an air conditioner for the vehicle. This vehicle air conditioner is a heat pump cycle device that conditions the air inside the vehicle and adjusts the temperature of devices of the vehicle.

Figure 1:
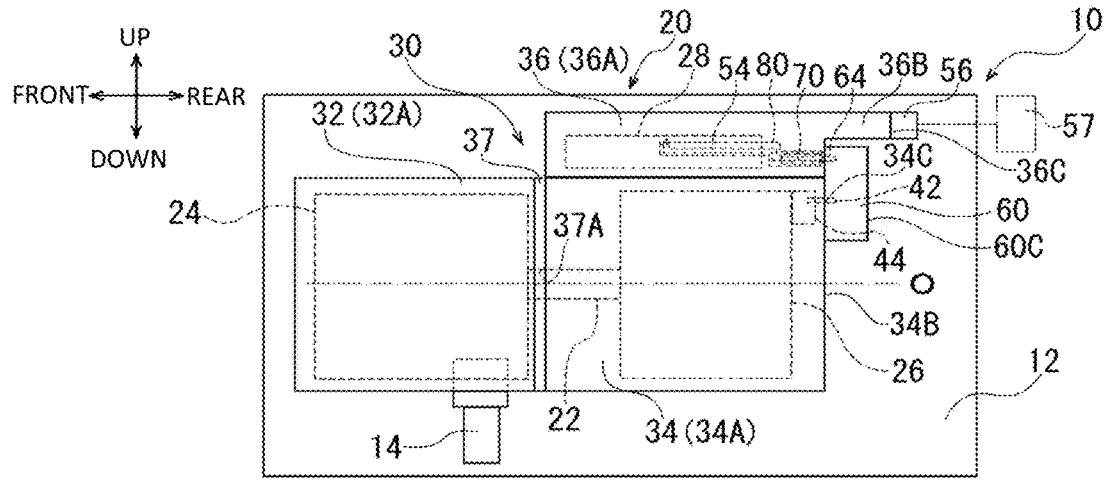
FIG. 1 is a schematic left side view of a compressor module that includes an electric compressor according to an embodiment.

In the embodiment, the directions of the compressor 20, such as the front-rear direction and the up-down direction, are defined by the solid arrows in FIG. 1. The foreground of FIG. 1 is defined as the left side of the compressor 20, and the background of FIG. 1 is defined as the right side of the compressor 20. The directions of the compressor 20 indicated in FIG. 2 and subsequent figures correspond to the directions of the compressor 20 in FIG. 1. The directions described in the following description correspond to the directions indicated in FIG. 1. The directions in the embodiment are merely examples, and the compressor 20 of the present disclosure may be mounted appropriately in various postures depending on the vehicle on which the compressor 20 is mounted.

Figure 2:
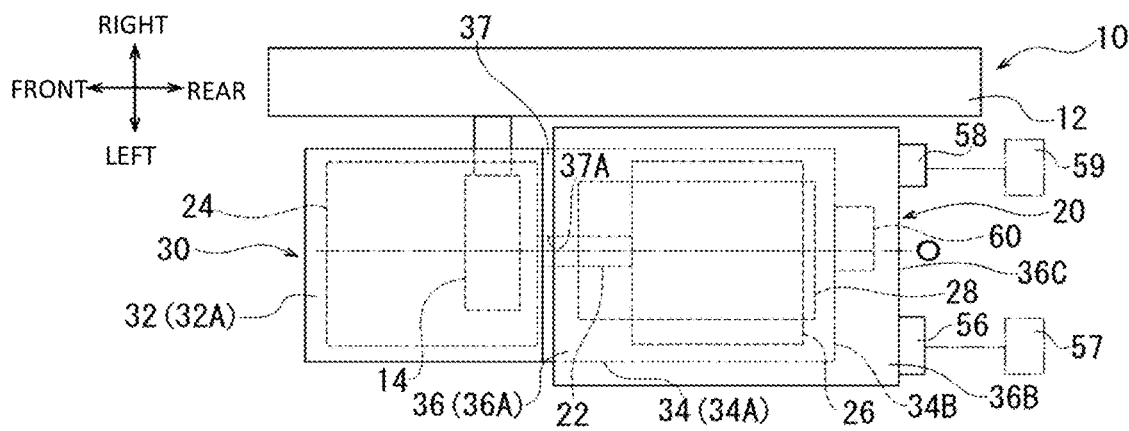
FIG. 2 is a schematic top view of the compressor module that includes the electric compressor according to the embodiment.
Figure 3:
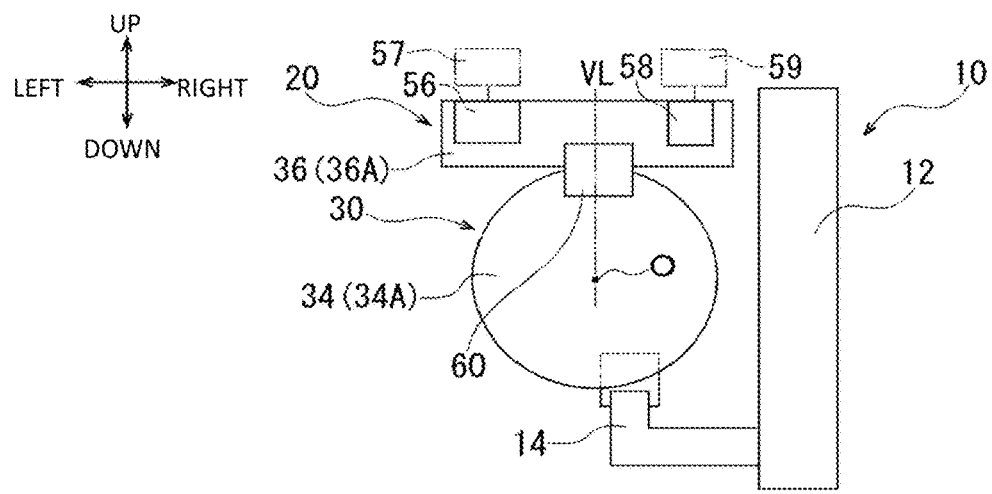
FIG. 3 is a schematic rear view of the compressor module that includes the electric compressor according to the embodiment.

As illustrated in FIGS. 1 to 3, the compressor 20 according to the embodiment serves as a part of a compressor module 10 incorporated in a heat pump cycle device (not illustrated). The compressor module 10 is integrated with devices of the heat pump cycle device. Specifically, the compressor module 10 is integrated with the devices of the heat pump cycle device, such as the compressor 20, an expansion valve, a regulating valve, an on-off valve, a chiller, a receiver, a water-cooled heat exchanger, and a muffler (not illustrated).

The heat pump cycle device performs switching control of the devices, such as the on-off valve according to various operating modes, thereby heating and cooling the air supplied to the inside of the vehicle with the refrigerant circulating through a refrigerant circuit, and cooling the cooling heat medium circulating through a heat medium circuit with the refrigerant circulating through the refrigerant circuit.

The compressor module 10 includes a flow distribution box 12 that has an approximately rectangular, flat, and thick plate shape. The devices of the heat pump cycle device are attached to the flow distribution box 12. Although not illustrated, the flow distribution box 12 has passages, such as a refrigerant passage for circulating the refrigerant in the refrigerant circuit in the heat pump cycle device and a heat medium passage for circulating the cooling heat medium in the heat medium circuit in the heat pump cycle device.

The outline of the compressor 20 is smaller than the outline of the rectangular-flat flow distribution box 12 when viewed from the lift side as illustrated in FIG. 1. The flow distribution box 12 is positioned in relation to the compressor 20 such that a rotation axis O of a rotary shaft 22 of the compressor 20 is parallel to a main surface of the flow distribution box 12, which has the largest area. More specifically, the rotation axis O of the rotary shaft 22 extends along and parallel to the longitudinal direction of the main surface of the flow distribution box 12. The compressor 20 may be disposed so that the rotation axis O of the rotary shaft 22 extends perpendicular to the main surface of the flow distribution box 12.

The compressor 20 includes the rotary shaft 22, a compression unit 24, a motor 26, an inverter 28, and a housing 30.

The housing 30 includes a compression unit housing 32 having a bottomed-cylindrical shape, a motor housing 34 having a bottomed-cylindrical shape and accommodating the motor 26, an inverter housing 36 accommodating the inverter 28, and a shaft support member 37. The compression unit housing 32 and the motor housing 34 have an approximately cylindrical outer shape. The inverter housing 36 has an approximately rectangular, flat, and thick plate shape. The shaft support member 37 has an approximately circular, flat, and thick plate shape.

The rotary shaft 22 is disposed in the compression unit housing 32 and the motor housing 34. The rotary shaft 22 has a solid cylindrical shape and extends in the front-rear direction of the compressor 20. The rotary shaft 22 is supported by the motor housing 34 and the shaft support member 37 such that the rotary shaft 22 is rotatable about the rotation axis O.

The compression unit housing 32 and the motor housing 34 are arranged side by side in a direction of the rotation axis O of the rotary shaft 22. The motor housing 34 is disposed behind the compression unit housing 32.

The motor housing 34 and the inverter housing 36 are arranged side by side in the radial direction of the rotary shaft 22. That is, the inverter housing 36 is disposed on a side surface of the motor housing 34.

In the following description, the direction of the rotation axis O will be simply referred to as the axial direction of the rotary shaft 22. The axial direction of the rotary shaft 22 corresponds to the front-rear direction of the compressor 20, and for the sake of explanation in the present embodiment, one side in the axial direction of the rotary shaft 22 means the front side of the compressor 20.

The compression unit housing 32 defines a compression unit chamber 32A. The motor housing 34 defines a motor chamber 34A. The motor housing 34 cooperates with the inverter housing 36 to define an inverter chamber 36A radially outside the motor housing 34. The inverter 28 is accommodated in the inverter chamber 36A. The shaft support member 37 is disposed between the compression unit housing 32 and the motor housing 34, and cooperates with the compression unit housing 32 to separate the compression unit chamber 32A from the motor chamber 34A. That is, the shaft support member 37 cooperates with the motor housing 34 to define the motor chamber 34A in which the motor 26 is accommodated, and cooperates with the compression unit housing 32 to define the compression unit chamber 32A in which the compression unit 24 is accommodated. The shaft support member 37 has an insertion hole 37A through which the rotary shaft 22 is inserted, and supports the rotary shaft 22 rotatably.

The compression unit 24 is accommodated in the compression unit chamber 32A. The compression unit 24 compresses the refrigerant with rotation of the rotary shaft 22. The refrigerant serves as a fluid of the present disclosure, for example. The compression unit 24 is connected to the refrigerant passage of the flow distribution box 12 via a high-pressure refrigerant hose 14. Although not illustrated, the motor chamber 34A is connected to the refrigerant passage of the flow distribution box 12 via a low-pressure refrigerant hose. The refrigerant flows into the motor chamber 34A through the refrigerant passage of the flow distribution box 12 via the low-pressure refrigerant hose, and further flows into the compression unit 24 via a suction passage (not illustrated) in the shaft support member 37.

Although not illustrated, the compression unit 24 includes a fixed scroll and a movable scroll. The rotation of the rotary shaft 22 rotates the movable scroll, so that the compression unit 24 changes the volume of a compression chamber formed between the fixed scroll and the movable scroll. The compression unit 24 therefore draws in the refrigerant from the refrigerant passage of the flow distribution box 12 via the low-pressure refrigerant hose to compress the refrigerant, and discharges the compressed refrigerant. The refrigerant discharged from the compression unit 24 flows into the refrigerant passage of the flow distribution box 12 via the high-pressure refrigerant hose 14.

The motor 26 is accommodated in the motor chamber 34A. Although not illustrated, the motor 26 includes a stator and a rotor. The stator is connected to the inverter 28. The rotary shaft 22 is fixed to the rotor. The rotor is rotated by power supplied from the inverter 28 to the stator, so that the motor 26 rotates the rotary shaft 22.

Figure 4:
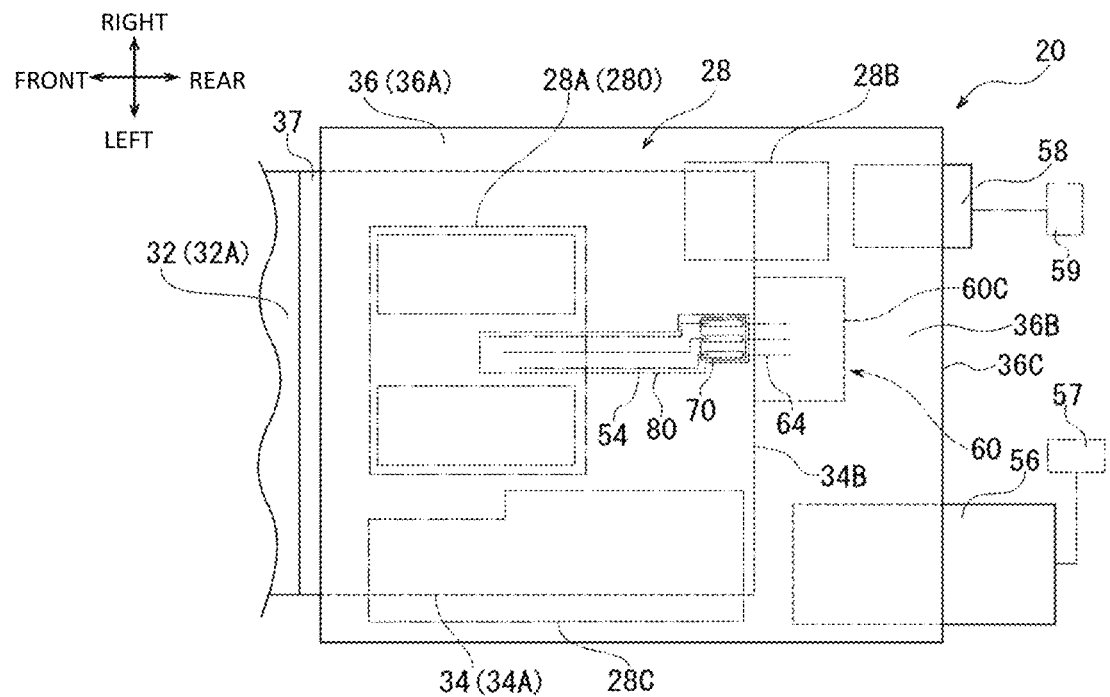
FIG. 4 is a partially schematic top view of the electric compressor according to the embodiment, illustrating an inverter housing.

The inverter 28 is accommodated in the inverter chamber 36A. As illustrated in FIG. 4, the inverter 28 includes an inverter circuit 28A, a control circuit 28B, and a high-voltage input filter 28C. The inverter circuit 28A drives the motor 26. The control circuit 28B controls the inverter circuit 28A. The high-voltage input filter 28C reduces noise of power supplied from an external power source 57 via a high-voltage connector 56, which will be described later. The inverter circuit 28A, the control circuit 28B, and the high-voltage input filter 28C each include a board, and electronic components and switching elements on the board. The board has thereon a circuit pattern. For example, a board 280 of the inverter circuit 28A has a pattern of the inverter circuit 28A.

The compressor 20 includes a plurality of conductive pins 42, a plurality of junction terminals 70, a plurality of inverter terminals 54, a plurality of bus bars 64, an electrical connector 60, and a resin case 80. The plurality of conductive pins 42, specifically, in this embodiment, the three conductive pins 42, are arranged side by side in the right-left direction of the compressor 20. The conductive pins 42 have the same configuration. The plurality of junction terminals 70, specifically, in this embodiment, the three junction terminals 70, are arranged side by side in the right-left direction of the compressor 20. The junction terminals 70 have the same configuration. The plurality of inverter terminals 54, specifically, in this embodiment, the three inverter terminals 54, are disposed in the inverter housing 36, and arranged side by side in the right-left direction of the compressor 20. The inverter terminals 54 basically have the same configuration. The plurality of bus bars 64, specifically, in this embodiment, the three bus bars 64, are arranged side by side in the right-left direction of the compressor 20. The bus bars 64 have the same configuration.

Figure 5:
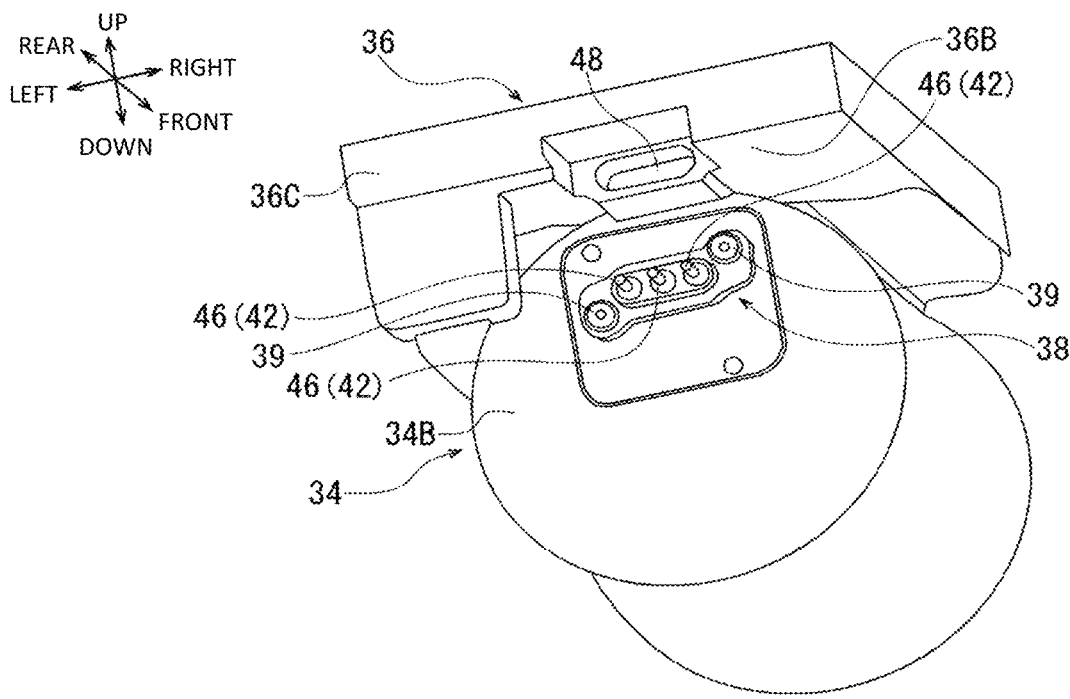
FIG. 5 is a partially perspective view of the electric compressor according to the embodiment, illustrating a housing and a hermetic terminal.
Figure 6:
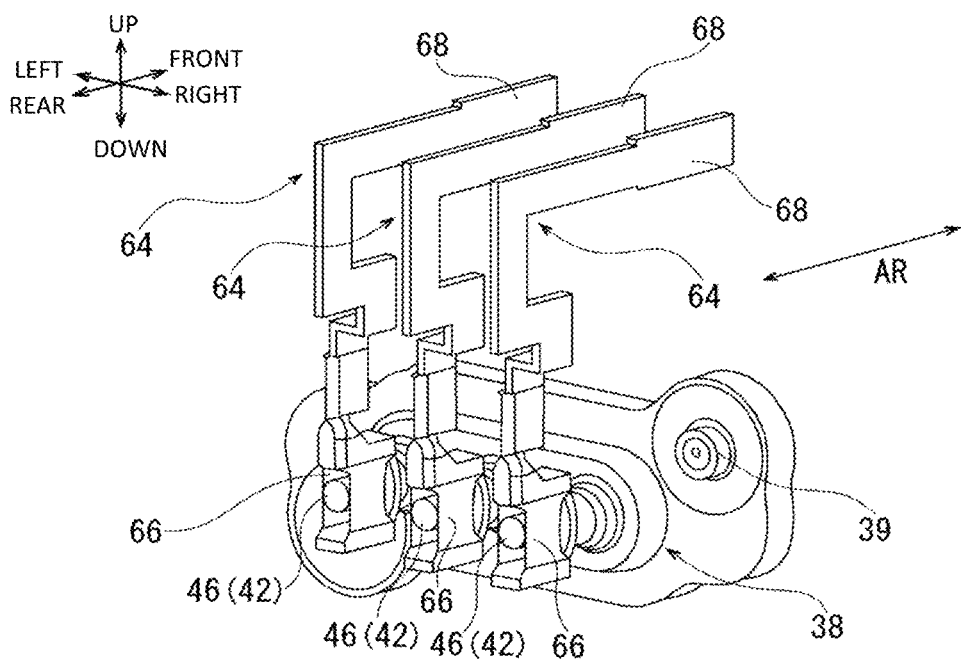
FIG. 6 is a perspective schematic view of a bus bar and the hermetic terminal of the electric compressor according to the embodiment, the bus bar having, at the other end of one end and the other end of the bus bar, a bus bar first terminal that is connected to a conductive pin of the hermetic terminal.

As illustrated in FIGS. 5 and 6, the conductive pins 42 each have a rod shape and disposed in the hermetic terminal 38. In the hermetic terminal 38, an insulating member is disposed between the conductive pins 42.

The hermetic terminal 38 is disposed on a bottom wall 34B of the motor housing 34. The motor housing 34 has one end and the other end that define the motor housing 34 in the axial direction of the rotary shaft 22, and has the bottom wall 34B at the other end. The bottom wall 34B has an approximately circular plate shape, and extends radially at the other end of the motor housing 34. The bottom wall 34B has a first through hole 34C (see FIG. 1) that is formed through the bottom wall 34B in the axial direction of the rotary shaft 22. The motor chamber 34A is connected to the outside of the motor chamber 34A through the first through hole 34C. The hermetic terminal 38 is disposed in the first through hole 34C, and the conductive pins 42 in the hermetic terminal 38 are held by the first through hole 34C. The hermetic terminal 38 is fixed to the bottom wall 34B by a plurality of first fastening members 39 (in this embodiment, two first fastening members 39). The hermetic terminal 38 ensures airtightness within the motor chamber 34A. The hermetic terminal 38 is electrically connected to the motor 26.

The conductive pins 42 extend linearly in the axial direction of the rotary shaft 22, and are inserted through the first through hole 34C. One end of each conductive pin 42 is inserted into a terminal box 44 made of resin and disposed in the motor chamber 34A (see FIG. 1). Although not illustrated, three motor wires extend from the stator of the motor 26, and each of the motor wires is electrically connected to one end of the corresponding conductive pin 42 via a connecting terminal in the terminal box 44.

The other end of the conductive pin 42 is a connection end 46 that protrudes from the bottom wall 34B to the outside of the motor chamber 34A and extends in the axial direction of the rotary shaft 22.

As illustrated in FIG. 5, the inverter housing 36 has one end and the other end that define the inverter housing 36 in the axial direction of the rotary shaft 22, and the inverter housing 36 has a communication hole 48 at the other end of the inverter housing 36. The communication hole 48 extends linearly in the axial direction of the rotary shaft 22 and opens toward the other side in the axial direction to connect the inverter chamber 36A with the outside of the inverter housing 36. The communication hole 48 has a hole shape elongated in the right-left direction of the compressor 20.

As illustrated in FIGS. 1 and 4, the resin case 80 is disposed in the inverter housing 36, i.e., in the inverter chamber 36A. The resin case 80 is made of resin and extends in the axial direction of the rotary shaft 22. The resin case 80 is fixed to the inverter housing 36 by a fastening member (not illustrated).

Figure 7:
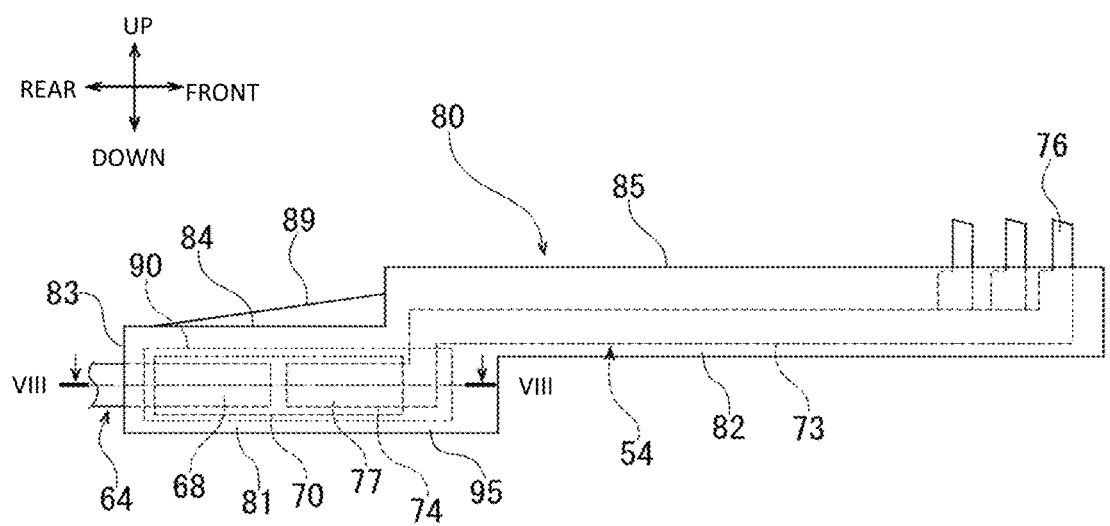
FIG. 7 is a schematic right side view of a resin case of the electric compressor according to the embodiment, illustrating an inverter terminal and the bus bar connected via a junction terminal in the resin case.
Figure 12:
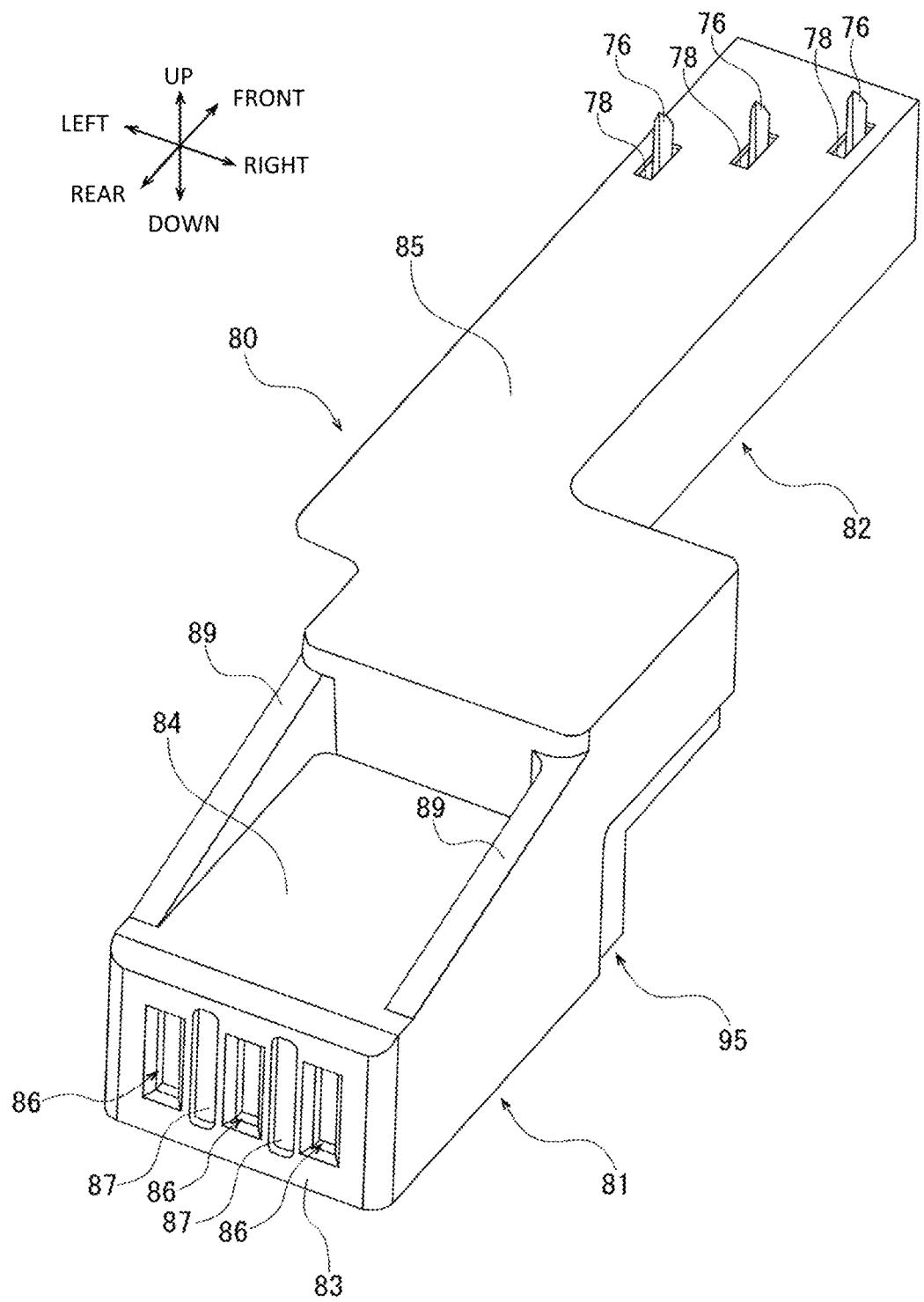
FIG. 12 is a perspective view of the resin case of the electric compressor according to the embodiment, the resin case accommodating the junction terminal and the inverter terminal.

As illustrated in FIGS. 7 and 12, the resin case 80 has a first accommodation portion 81 for accommodating the junction terminals 70, a second accommodation portion 95 for accommodating the bent portion of the present disclosure, and a third accommodation portion 82. The first accommodation portion 81, the second accommodation portion 95, and the third accommodation portion 82 are arranged from the other side to the one side in the axial direction of the rotary shaft 22, and the second accommodation portion 95 is located between the first accommodation portion 81 and the third accommodation portion 82. The third accommodation portion 82 is raised from the first accommodation portion 81 in the up-down direction of the compressor 20, and extends from the second accommodation portion 95 further toward the one side in the axial direction of the rotary shaft 22. The resin case 80 has a rear surface 83, a first upper surface 84, and a second upper surface 85. The rear surface 83 is located on the other side in the axial direction of the rotary shaft 22. The first upper surface 84 is approximately perpendicular to an upper end of the rear surface 83, and extends from the upper end of the rear surface 83 toward the one side in the axial direction of the rotary shaft 22. The second upper surface 85 is raised from the first upper surface 84 and extends toward the one side in the axial direction of the rotary shaft 22.

Figure 8:
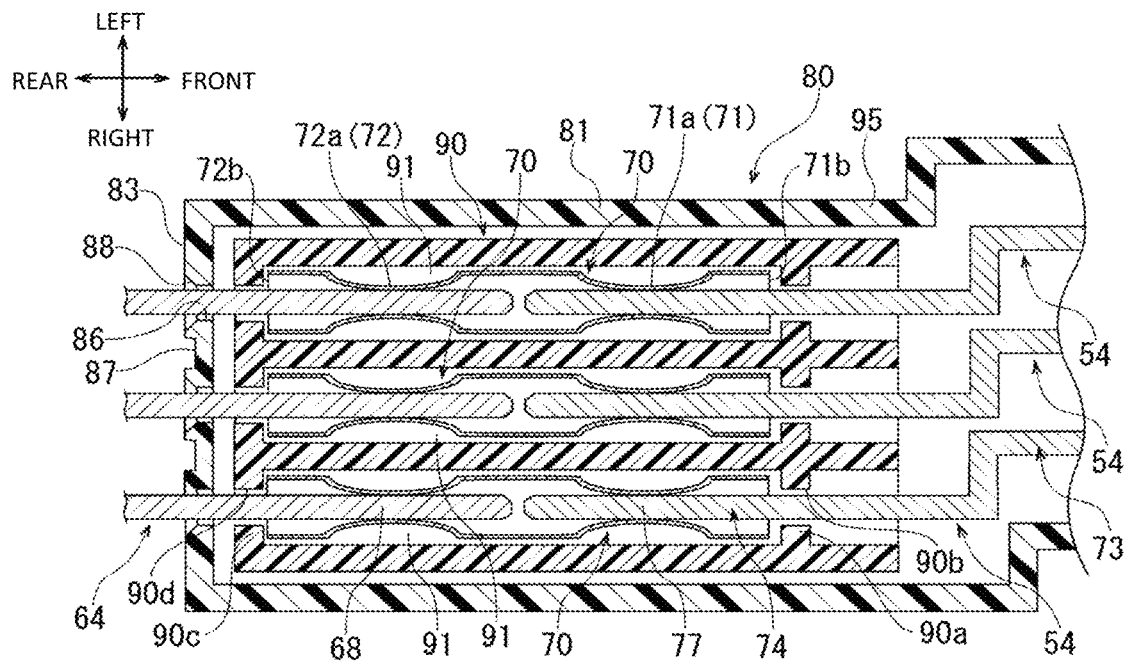
FIG. 8 is a partial cross-sectional view of the resin case of the electric compressor according to the embodiment, taken along a line VIII-VIII in FIG. 7, illustrating the inverter terminal and the bus bar connected via the junction terminal in the resin case.
Figure 11:
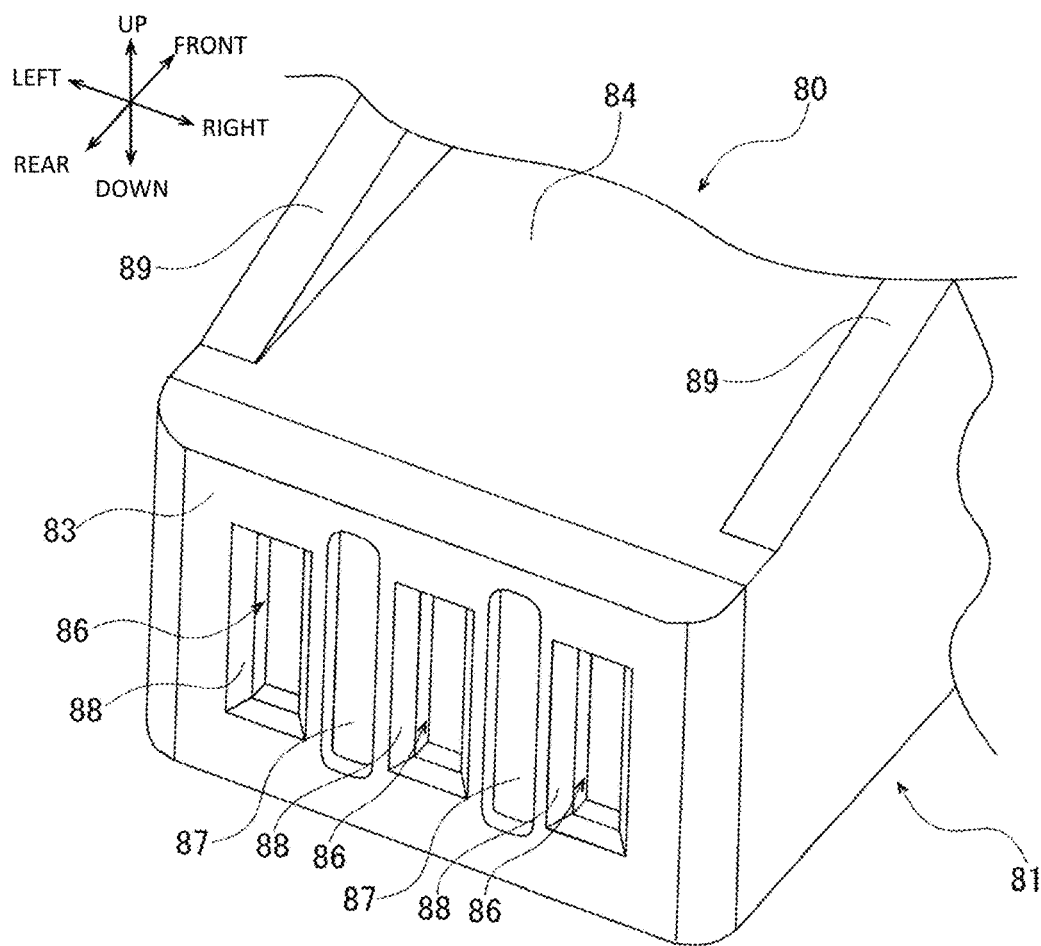
FIG. 11 is a partial perspective view of the resin case of the electric compressor according to the embodiment, illustrating a first upper surface of the resin case enlarged, the resin case accommodating the junction terminal and the inverter terminal.

The rear surface 83 of the resin case 80 faces the communication hole 48 of the inverter housing 36 in the axial direction of the rotary shaft 22. As illustrated in FIGS. 8, 11, and 12, the rear surface 83 of the resin case 80 has a plurality of resin-case through holes 86, in this embodiment, specifically three resin-case through holes 86, opened on the rear surface 83, and a plurality of recesses 87, in this embodiment, specifically, two recesses 87. The resin-case through holes 86 have the same configuration. The recesses 87 have the same configuration.

The three resin-case through holes 86 are arranged side by side on the rear surface 83 with spacing between the resin-case through holes 86 in the right-left direction of the compressor 20. Each of the resin-case through holes 86 has a rectangular shape and extends in the up-down direction of the compressor 20 in cross-section, and is formed through a rear wall of the resin case 80 in the axial direction of the rotary shaft 22.

The resin-case through hole 86 is defined by a tapered surface 88. Specifically, the resin-case through hole 86 has an opening opened on the rear surface 83, and the opening is defined by the tapered surface 88 that gradually reduces an area of the opening in an insertion direction of a second bus bar terminal 68, which will be described later. That is, the opening of the resin-case through hole 86 through which the second bus bar terminal 68 is inserted is formed by the tapered surface 88. The tapered surface 88 forms a tapered shape of the opening of the resin-case through hole 86, which is opened on the rear surface 83, so that the size of the opening gradually decreases in the insertion direction of the second bus bar terminal 68. More specifically, the tapered surface 88 forms a tapered shape of the opening of the resin-case through hole 86 so that the dimensions of the opening in the right-left direction and the up-down direction decrease as the resin-case through hole 86 extends in the insertion direction of the second bus bar terminal 68.

Each of the recesses 87 is disposed between the resin-case through holes 86. The recess 87 has an approximately rectangular shape, and is longer than the resin-case through hole 86 in the up-down direction.

As illustrated in FIG. 12, the resin case 80 has a pair of ribs 89 disposed on the first upper surface 84. Each of the ribs 89 extends from the first accommodation portion 81 of the resin case 80 to the second accommodation portion 95 in the axial direction of the rotary shaft 22, and the dimension of the rib 89 gradually increases from the first accommodation portion 81 to the second accommodation portion 95. That is, in the present embodiment, the dimension of the rib 89 in the up-down direction of the compressor 20 (i.e., the height of the rib 89 in the up-down direction in FIG. 12) gradually increases from the first accommodation portion 81 to the second accommodation portion 95. More specifically, the rib 89 extends upward from the first upper surface 84, and extends in an extension direction of the resin-case through hole 86. The rib 89 has an approximately right-angled triangle shape. The ribs 89 are respectively located at a right end and a left end portion of the first upper surface 84 so that the hypotenuse of the right-angled triangle shape faces diagonally upward and rearward. The second upper surface 85 of the resin case 80 has through holes 78, and first inverter terminals 76 of the inverter terminals 54 are respectively inserted through the through holes 78.

Figure 10:
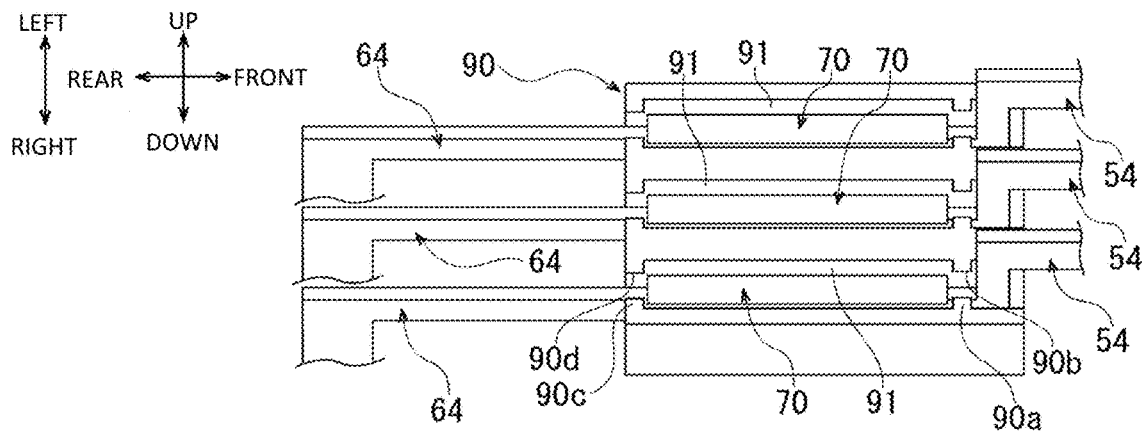
FIG. 10 is a partial perspective view of the inverter terminal and the bus bar of the electric compressor according to the embodiment, illustrating the inverter terminal and the bus bar connected via the junction terminal.

As illustrated in FIGS. 7 and 8, a holder 90 made of resin is disposed in the first accommodation portion 81 of the resin case 80. As illustrated in FIG. 10, a plurality of accommodation chambers 91 (in the present embodiment, three accommodation chambers 91) is formed in the holder 90. The three accommodation chambers 91 are arranged in the right-left direction of the compressor 20. Each of the junction terminals 70 is accommodated in the corresponding accommodation chamber 91 in the holder 90. The holder 90 accommodating the junction terminals 70 is accommodated in the first accommodation portion 81 in the resin case 80.

The accommodation chamber 91 has opposite ends that define the accommodation chamber 91 in the axial direction of the rotary shaft 22, and the holder 90 has a first restriction wall 90a and a first opening 90b at one end of the opposite ends of the accommodation chamber 91. Similarly, the holder 90 has a second restriction wall 90c and a second opening 90d at the other end of the accommodation chamber 91. The junction terminal 70 in the accommodation chamber 91 is restricted from moving in the axial direction of the rotary shaft 22 by the first restriction wall 90a and the second restriction wall 90c. A second inverter terminal 77 of the inverter terminal 54, which will be described later, is inserted into the corresponding accommodation chamber 91 through the first opening 90b. Similarly, the second bus bar terminal 68 of the bus bar 64 is inserted into the corresponding accommodation chamber 91 through the second opening 90d. The junction terminal 70 faces the corresponding resin-case through hole 86 in the axial direction of the rotary shaft 22 via the corresponding second opening 90d, and therefore faces the corresponding communication hole 48 of the inverter housing 36 in the axial direction of the rotary shaft 22.

As illustrated in FIG. 8, the junction terminal 70 has a first female terminal 71 and a second female terminal 72. The junction terminal 70 has opposite ends that define the junction terminal 70 in the axial direction of the rotary shaft 22, and the junction terminal 70 has a first open end 71b at one end of the opposite ends and a second open end 72b at the other end of the opposite ends. The first female terminal 71 and the second female terminal 72 have the same shape and are arranged side by side in the axial direction of the rotary shaft 22. The junction terminal 70 is integrally formed by bending a metal plate, for example.

The first female terminal 71 has a pair of first holding portions 71a that are elastically deformable and each have an approximately U-shape. The first female terminal 71 has the first open end 71b of the junction terminal 70 into which the second inverter terminal 77 of the inverter terminal 54 is fitted through the first opening 90b. The first holding portions 71a of the first female terminal 71 face each other in the right-left direction of the compressor 20. The first holding portions 71a tightly hold the second inverter terminal 77 of the inverter terminal 54 by means of elastic restoring force.

Similarly, the second female terminal 72 has a pair of second holding portions 72a that are elastically deformable and each have an approximately U-shape. The second female terminal 72 has the second open end 72b of the junction terminal 70 into which the second bus bar terminal 68 of the bus bar 64 is fitted through the second opening 90d. The second holding portions 72a of the second female terminal 72 face each other in the right-left direction of the compressor 20. The second holding portions 72a tightly hold the second bus bar terminal 68 of the bus bar 64 by means of elastic restoring force.

The second inverter terminal 77 of the inverter terminal 54 is fitted into the first female terminal 71 of the junction terminal 70 in the axial direction of the rotary shaft 22 in such a way, so that the second inverter terminal 77 is connected to the first female terminal 71. Similarly, the second bus bar terminal 68 of the bus bar 64 is fitted into the second female terminal 72 of the junction terminal 70 in the axial direction of the rotary shaft 22 in such a way, so that the second bus bar terminal 68 is connected to the second female terminal 72.

Figure 9:
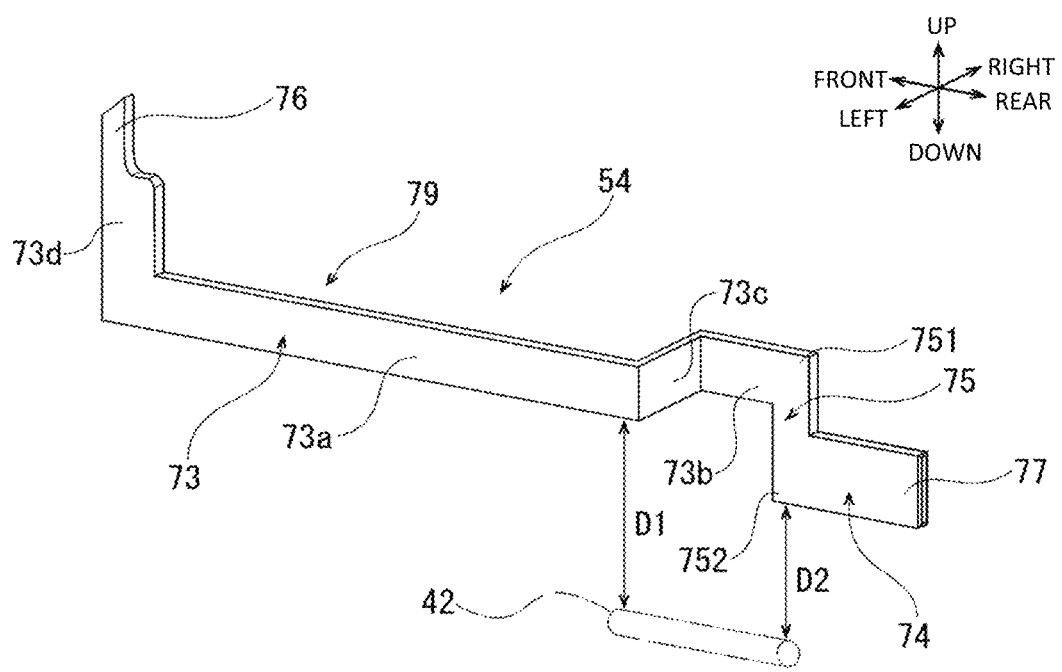
FIG. 9 is a perspective view of the inverter terminal of the electric compressor according to the embodiment.

As illustrated in FIG. 9, the inverter terminal 54 has a plate shape and is integrally formed by bending a metal plate, for example. The inverter terminal 54 has a plurality of edgewise bent portions and a plurality of flatwise bent portions (in the present embodiment, three edgewise bent portions and two flatwise bent portions). Specifically, the inverter terminal 54 has opposite ends that define the inverter terminal 54 in the axial direction of the rotary shaft 22, and has a first edgewise bent portion, a first flatwise bent portion, a second flatwise bent portion, a second edgewise bent portion, and a third edgewise bent portion arranged in this order from the one end of the opposite ends of the inverter terminal 54 toward the other end of the opposite ends of the inverter terminal 54 in the axial direction of the rotary shaft 22.

The inverter terminal 54 has the first inverter terminal 76 and the second inverter terminal 77 respectively at the one end and the other end of the inverter terminal 54, and an extension portion 79 located between the first inverter terminal 76 and the second inverter terminal 77. The inverter terminal 54 is electrically connected to the board 280 of the inverter circuit 28A on which the pattern is formed. Specifically, the first inverter terminal 76 is connected to the pattern on the board 280 of the inverter circuit 28A. The second inverter terminal 77 is connected to the first female terminal 71 of the junction terminal 70. The extension portion 79 extends so that the second inverter terminal 77 is spaced away from the board 280.

The extension portion 79 has a first bent portion 751 and a second bent portion 752. The inverter terminal 54 has a first step portion 73, a second step portion 74 located lower than the first step portion 73, and a connecting portion 75 that extends in the up-down direction of the compressor 20 and integrally connects the first step portion 73 and the second step portion 74. The first step portion 73 and the connecting portion 75 are connected by the first bent portion 751 serving as the second edgewise bent portion. The connecting portion 75 and the second step portion 74 are connected by the second bent portion 752 serving as the third edgewise bent portion. The first bent portion 751 and the second bent portion 752 serve as the bent portion of the present disclosure. The first bent portion 751, the connecting portion 75, and the second bent portion 752 of the inverter terminal 54 are accommodated in the second accommodation portion 95 in the resin case 80.

The first step portion 73 integrally has a first portion 73a, a second portion 73b, and a third portion 73c. The first portion 73a and the second portion 73b are located on the one side and the other side in the axial direction of the rotary shaft 22, and the first portion 73a extends longer than the second portion 73b. The third portion 73c extends in the right-left direction of the compressor 20 and connects the first portion 73a and the second portion 73b. The first portion 73a and the third portion 73c are connected by the first flatwise bent portion, and the third portion 73c and the second portion 73b are connected by the second flatwise bent portion.

The first step portion 73 has opposite ends that define the first step portion 73 in the axial direction of the rotary shaft 22, and one end of the opposite ends of the first step portion 73 serves as one end of the first portion 73a that defines the first portion 73a in the axial direction of the rotary shaft 22. The first step portion 73 further has a fourth portion 73d that is formed integrally with the one end of the first portion 73a via the first edgewise bent portion and extends upward from the one end of the first portion 73a. The distal end of the fourth portion 73d serves as the first inverter terminal 76. The three inverter terminals 54 are arranged in the right-left direction of the compressor 20, and each have the first portion 73a. Of the three first portions 73a, the first portion 73a of the right inverter terminal 54 is the longest, and the first portion 73a of the left inverter terminal 54 is the shortest in the axial direction of the rotary shaft 22.

The second step portion 74 is longer than the second portion 73b of the first step portion 73 and shorter than the first portion 73a of the first step portion 73, and extends from a lower end of the connecting portion 75 on the other side in the axial direction of the rotary shaft 22. The second step portion 74 has opposite ends, i.e., one end and the other end, that define the second step portion 74 in the axial direction of the rotary shaft 22, and the other end serves as the second inverter terminal 77. That is, the second inverter terminal 77 is a male terminal.

When the conductive pin 42, the first step portion 73, and the second step portion 74 are projected onto an imaginary plane that is perpendicular to the axial direction of the rotary shaft 22, a distance D2 between the conductive pin 42 and the second step portion 74 is shorter than a distance D1 between the conductive pin 42 and the first step portion 73 on the imaginary plane (see FIG. 9).

As illustrated in FIG. 12, the first inverter terminal 76 of the inverter terminal 54 protrudes upward through the corresponding through hole 78 of the resin case 80. In other words, the inverter terminal 54 is accommodated together with the junction terminal 70 in the resin case 80, which is made of resin, such that the first inverter terminal 76 is disposed outside the resin case 80. The first inverter terminal 76 is electrically connected to the inverter circuit 28A.

As illustrated in FIG. 5, the inverter housing 36 has an extension portion 36B. The extension portion 36B extends beyond the bottom wall 34B of the motor housing 34 on the other side in the axial direction of the rotary shaft 22. As illustrated in FIG. 4, the extension portion 36B protrudes beyond the electrical connector 60 in the axial direction of the rotary shaft 22 with respect to the bottom wall 34B of the motor housing 34.

The extension portion 36B is connected to the high-voltage connector 56 and a communication connector 58 (see FIG. 4). The high-voltage connector 56 supplies power from the external power source 57 to the motor 26. The communication connector 58 transmits a control signal output from an external control device 59 to the control circuit 28B of the inverter 28. The external control device 59 uses power less than the power supplied by the external power source 57.

As illustrated in FIGS. 1, 2, and 4, the electrical connector 60 is disposed outside of the housing 30 on the other side in the axial direction of the rotary shaft 22. The electrical connector 60 electrically connects the conductive pin 42 and the inverter terminal 54. The electrical connector 60 includes an accommodation case 62, which will be described later. The accommodation case 62 is fixed to the bottom wall 34B of the motor housing 34 by a plurality of second fastening members 61 (in this embodiment, two second fastening members 61) (see FIG. 14). When the electrical connector 60 is fixed, the electrical connector 60 is moved in the axial direction of the rotary shaft 22. This causes each of a plurality of first bus bar terminals 66 to be connected to the corresponding connection end 46 of the conductive pin 42, and also causes each of a plurality of second bus bar terminals 68 to be connected to the corresponding second female terminal 72.

As illustrated in FIG. 3, the electrical connector 60 extends in a direction perpendicular to the axial direction of the rotary shaft 22, and is disposed on an imaginary straight line VL passing through the rotation axis O of the rotary shaft 22. Furthermore, the high-voltage connector 56 and the communication connector 58 are respectively disposed on the opposite sides of the electrical connector 60 in the direction perpendicular to the axial direction of the rotary shaft 22. That is, the high-voltage connector 56 is disposed on the side opposite to the communication connector 58 with the electrical connector 60 positioned between the high-voltage connector 56 and the communication connector 58.

Figure 14:
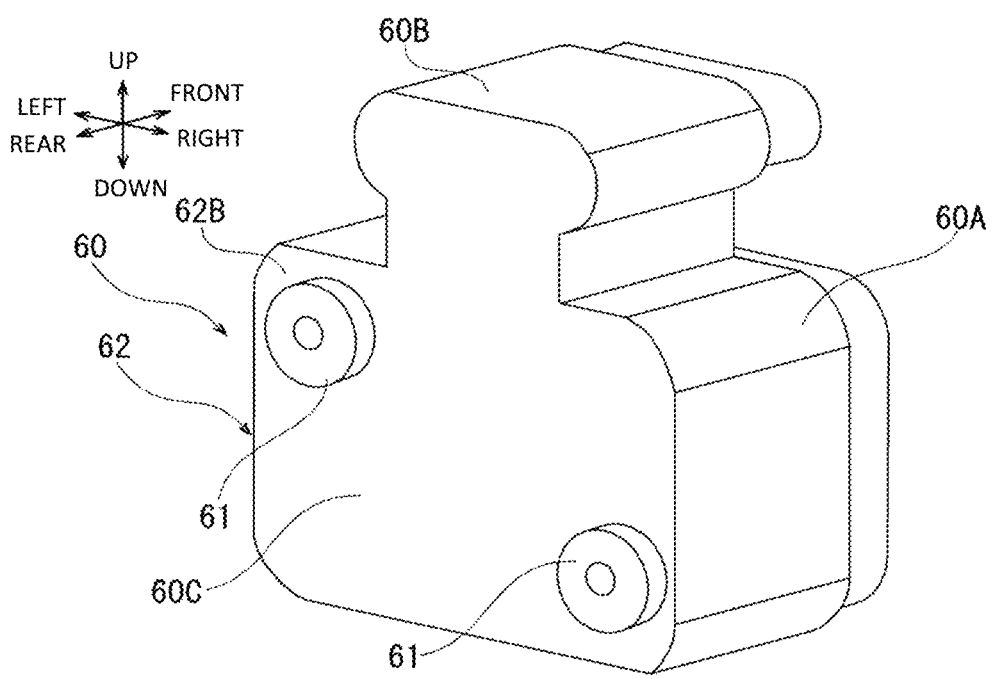
FIG. 14 is a schematic perspective rear view of the electrical connector of the electric compressor according to the embodiment.

As illustrated in FIG. 14, the electrical connector 60 has a body 60A and a head 60B. The body 60A has an approximately rectangular shape in a cross section perpendicular to the axial direction of the rotary shaft 22 (the front-rear direction of the compressor 20). In the cross section perpendicular to the axial direction, the head 60B has an approximately elliptical shape that has a pair of straight lines extending in the right-left direction and parallel to each other.

Figure 15:
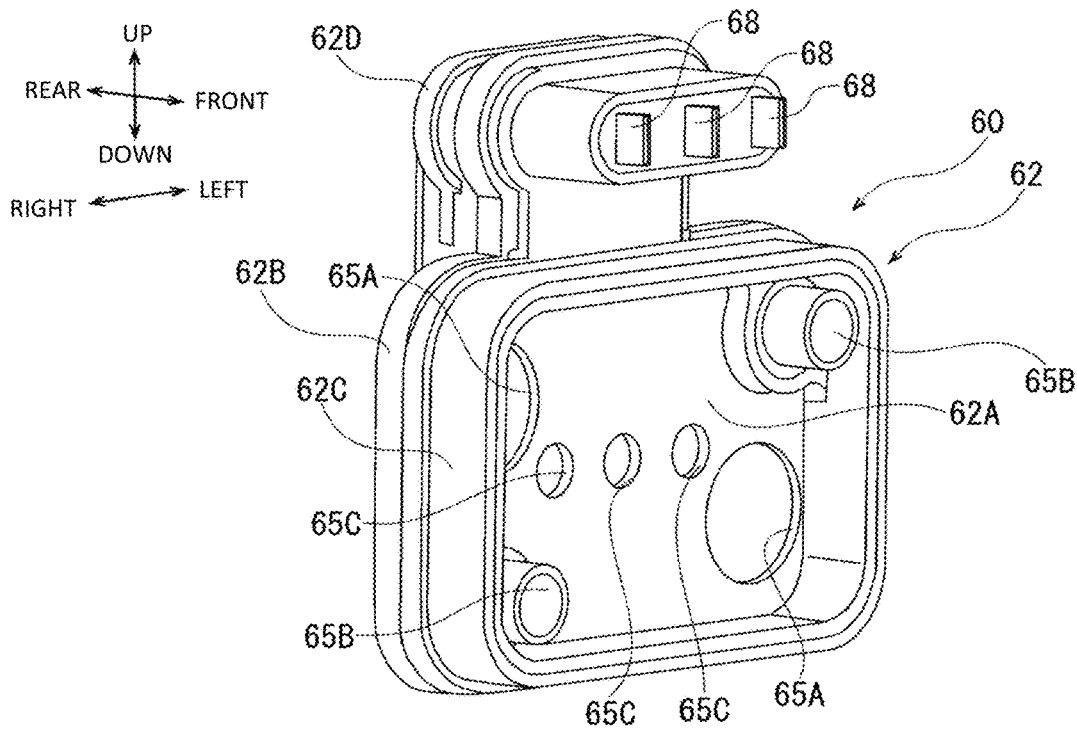
FIG. 15 is a schematic perspective front view of the electrical connector of the electric compressor according to the embodiment.
Figure 16:
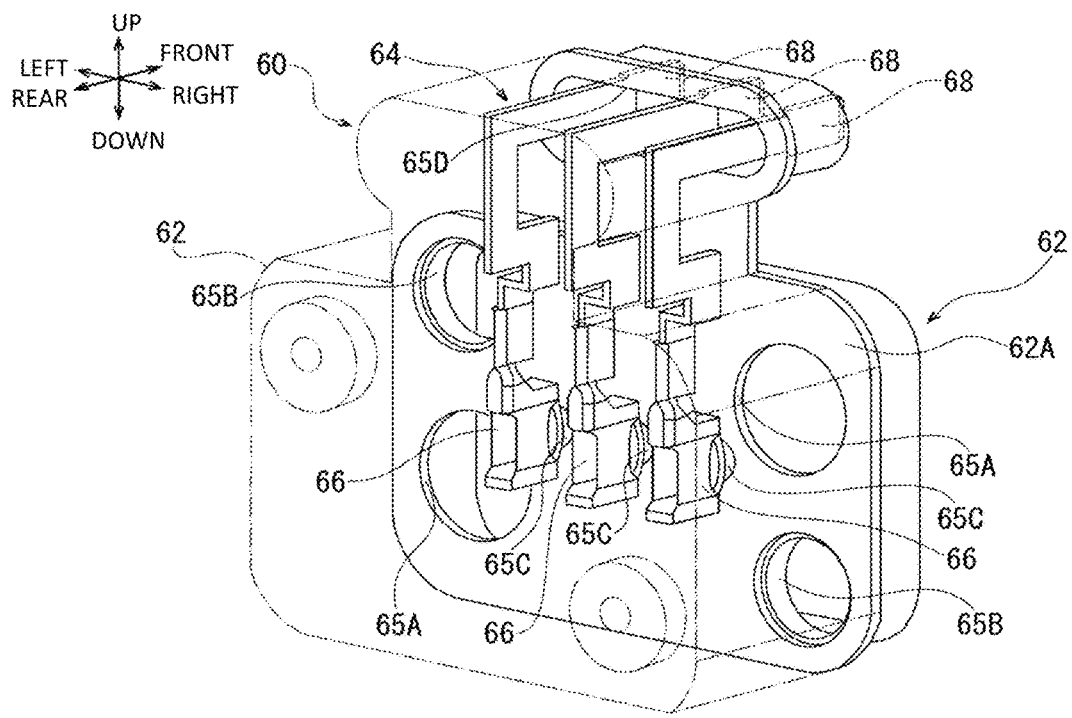
FIG. 16 is a schematic perspective rear view of a part of the accommodation case and the bus bar of the electric compressor according to the embodiment.

As illustrated in FIGS. 15 and 16, the electrical connector 60 includes the accommodation case 62 and the three bus bars 64.

As illustrated in FIG. 6, each of the bus bars 64 has opposite ends that define the bus bar 64 in the axial direction of the rotary shaft 22, and has the second bus bar terminal 68 at one end of the opposite ends and the first bus bar terminal 66 at the other end of the opposite ends. The first bus bar terminal 66 serves as the first terminal of the present disclosure. The first bus bar terminal 66 is a receptacle terminal. The second bus bar terminal 68 serves as the second terminal of the present disclosure. The second bus bar terminal 68 is a male terminal.

The second bus bar terminal 68 is formed integrally with the one end of the bus bar 64. The second bus bar terminal 68 extends linearly in the axial direction of the rotary shaft 22.

The first bus bar terminal 66 is fixed to the other end of the bus bar 64. The first bus bar terminal 66 is arranged at a predetermined position in the accommodation case 62. The first bus bar terminal 66 is fixed in the accommodation case 62. That is, as the accommodation case 62 of the electrical connector 60 is moved along the bottom wall 34B of the motor housing 34, the first bus bar terminal 66 moves in a direction along the bottom wall 34B of the motor housing 34. The first bus bar terminal 66 has an opening into which the connection end 46 of the conductive pin 42 is inserted, and the diameter of the opening of the first bus bar terminal 66 is equal to the diameter of the connection end 46 of the conductive pin 42.

The thickness direction of the bus bar 64 corresponds to the direction perpendicular to the axial direction of the rotary shaft 22 (the direction indicated by the arrow AR in FIG. 6). The bus bar 64 has a plate shape, and is integrally formed by bending a metal plate, for example. The bus bar 64 has a plurality of edgewise bent portions and a plurality of flatwise bent portions (in the present embodiment, three edgewise bent portions and two flatwise bent portions). Specifically, the bus bar 64 has a first edgewise bent portion, a second edgewise bent portion, a third edgewise bent portion, a first flatwise bent portion, and a second flatwise bent portion arranged in this order from the one end of the bus bar 64 toward the other end of the bus bar 64 in the axial direction of the rotary shaft 22.

That is, the bus bar 64 is shaped by edgewise bending so that the second bus bar terminal 68 is fitted into the second female terminal 72 in the axial direction of the rotary shaft 22 and shaped by flatwise bending so that a position of the first bus bar terminal 66 is adjusted in the direction along the bottom wall 34B of the motor housing 34.

That is, this configuration allows the first bus bar terminal 66 at the other end of the bus bar 64 to be movable in a direction perpendicular from the second flatwise bent portion to the axial direction of the rotary shaft 22, i.e., the direction along the bottom wall 34B of the motor housing 34 with respect to the position of the second bus bar terminal 68 at the one end of the bus bar 64. The bus bar 64 is accommodated in the accommodation case 62. Accordingly, as the accommodation case 62 is moved along the bottom wall 34B of the motor housing 34, the first bus bar terminal 66 at the other end of the bus bar 64 accommodated in the accommodation case 62 is movable in the direction along the bottom wall 34B of the motor housing 34. This configuration allows the first bus bar terminal 66 and the second bus bar terminal 68 to be respectively fitted into the conductive pin 42 and the second female terminal 72 in the bus bar 64.

The accommodation case 62 has a base portion 62A made of resin, a cover portion 62B made of resin, a first seal portion 62C, and a second seal portion 62D.

The base portion 62A and the cover portion 62B cooperate to have a body portion having a shape corresponding to the body 60A of the electrical connector 60 and a head portion having a shape corresponding to the head 60B of the electrical connector 60 in a cross section perpendicular to the axial direction of the rotary shaft 22.

The base portion 62A has a plurality of first insertion holes 65A, a plurality of second insertion holes 65B, a plurality of second through holes 65C, and a third insertion hole 65D (in this embodiment, two first insertion holes 65A, two second insertion holes 65B, three second through holes 65C, and one third insertion hole 65D). The first insertion holes 65A, the second insertion holes 65B, and the second through holes 65C are formed in the body portion. The third insertion hole 65D is formed in the head portion.

The body portion of the base portion 62A is disposed so as to surround the hermetic terminal 38 on the bottom wall 34B. That is, the hermetic terminal 38 is accommodated in the accommodation case 62, and the hermetic terminal 38 is not exposed to the outside.

The first fastening members 39 for fixing the hermetic terminal 38 to the bottom wall 34B are respectively inserted into the first insertion holes 65A. The second fastening members 61 for fixing the electrical connector 60 to the bottom wall 34B are respectively inserted into the second insertion holes 65B. The connection ends 46 of the conductive pins 42 are respectively inserted toward the first bus bar terminal 66 through the second through holes 65C. A part of each bus bar 64 adjacent to the second bus bar terminal 68 and a part of the accommodation case 62 are inserted into the third insertion hole 65D.

The cover portion 62B is formed integrally with the base portion 62A such that the bus bars 64 and the first bus bar terminal 66 are disposed between the cover portion 62B and the base portion 62A. That is, the bus bar 64 and the first bus bar terminal 66 are accommodated in the accommodation case 62. The cover portion 62B provides insulation between the bus bars 64.

Figure 13:
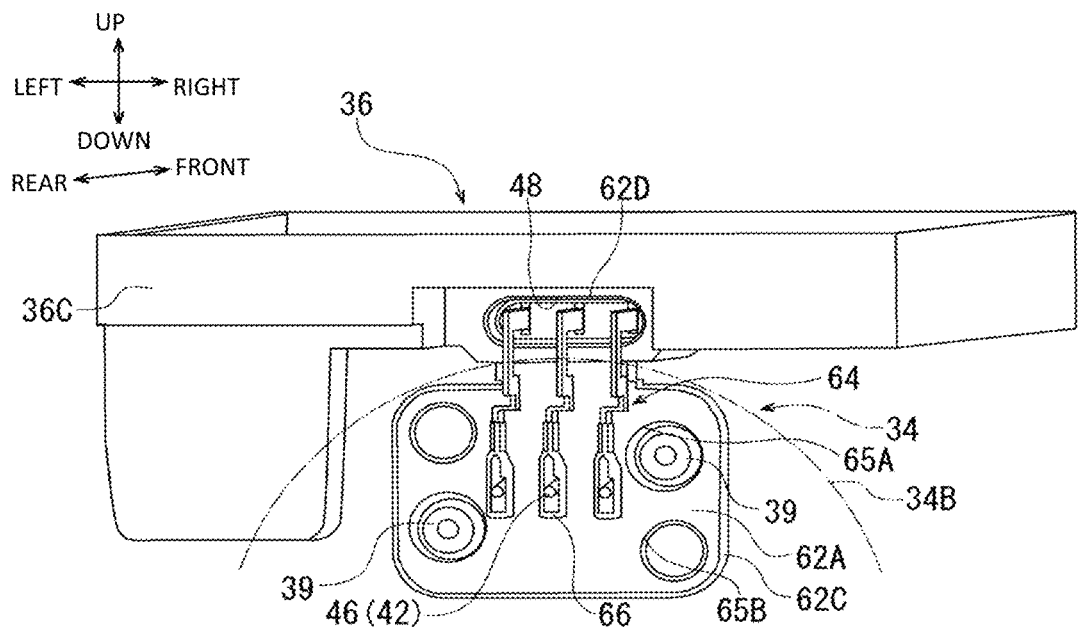
FIG. 13 is a partial perspective view of an accommodation case of an electrical connector, the bus bar, the hermetic terminal, and the inverter housing of the electric compressor according to the embodiment.

The first seal portion 62C is an annular packing that surrounds the body portion of the base portion 62A. As illustrated in FIG. 13, an end face of the first seal portion 62C having an annular shape serves as a planar sealing by coming into contact with the bottom wall 34B with the electrical connector 60 attached the bottom wall 34B.

The second seal portion 62D is disposed at the head portion of the cover portion 62B. The second seal portion 62D is an annular packing, and has an outer peripheral surface formed into a shape corresponding to the shape of the inner peripheral surface of the communication hole 48 of the inverter housing 36. As illustrated in FIG. 13, the outer peripheral surface of the second seal portion 62D having an annular shape serves as a cylindrical sealing by coming into contact with the inner peripheral surface of the communication hole 48 with the electrical connector 60 attached to the bottom wall 34B.

As illustrated in FIG. 15, the bus bar 64 is accommodated in the accommodation case 62 such that the second bus bar terminal 68 is disposed outside the accommodation case 62. The second bus bar terminal 68 is inserted into the inverter chamber 36A of the inverter housing 36 through the communication hole 48. As illustrated in FIGS. 7 and 8, the second bus bar terminal 68 is connected to the second female terminal 72 of the junction terminal 70 in the resin case 80 in the inverter chamber 36A.

In the compressor 20, the inverter terminal 54 is connected to the inverter circuit 28A of the inverter housing 36. The conductive pin 42 in the motor housing 34 is electrically connected to the motor 26. The inverter terminal 54 and the conductive pin 42 are electrically connected by the electrical connector 60. The electrical connector 60 has the bus bar 64. The bus bar 64 includes the first bus bar terminal 66 connected to the conductive pin 42 outside the motor housing 34, and the second bus bar terminal 68 connected to the junction terminal 70 disposed on the inverter terminal 54 inside the inverter housing 36. That is, the junction terminal 70 connects the inverter terminal 54 and the second bus bar terminal 68 inside the inverter housing 36.

The electrical connector 60 is moved in the axial direction of the rotary shaft 22, so that the first bus bar terminal 66 of the bus bar 64 is fitted into and connected to the conductive pin 42 and so that the second bus bar terminal 68 of the bus bar 64 is fitted into and connected to the second female terminal 72 of the junction terminal 70.

For example, the connection of the inverter terminal 54 to the junction terminal 70 and the connection of the bus bar 64 to the junction terminal 70 and the conductive pin 42 are performed as follows.

First, the inverter terminal 54 is moved toward the junction terminal 70 in the axial direction of the rotary shaft 22. The second inverter terminal 77 of the inverter terminal 54 is fitted into the first female terminal 71 of the junction terminal 70 in the axial direction of the rotary shaft 22, so that the second inverter terminal 77 is connected to the first female terminal 71. Next, the inverter terminal 54, the second inverter terminal 77, and the junction terminal 70 are accommodated in the resin case 80. The first inverter terminal 76 of the inverter terminal 54 is connected to the inverter circuit 28A in the inverter chamber 36A. The motor housing 34 and the inverter housing 36 are fixed together. Then, the hermetic terminal 38 is fixed to the bottom wall 34B of the motor housing 34. The electrical connector 60 is moved toward the bottom wall 34B of the motor housing 34 in the axial direction of the rotary shaft 22. Specifically, the second bus bar terminal 68 and the first bus bar terminal 66 of the bus bar 64 are moved respectively toward the junction terminal 70 and the hermetic terminal 38 in the axial direction of the rotary shaft 22. Accordingly, the second bus bar terminal 68 of the bus bar 64 is fitted into and connected to the second female terminal 72 of the junction terminal 70 in the axial direction of the rotary shaft 22, and the first bus bar terminal 66 of the bus bar 64 is fitted into and connected to the conductive pin 42 of the hermetic terminal 38 in the axial direction of the rotary shaft 22.

This allows the connection between the second female terminal 72 of the junction terminal 70 and the second bus bar terminal 68 of the bus bar 64 to be simultaneously performed with the connection between the conductive pin 42 and the first bus bar terminal 66 of the bus bar 64 by simply moving the electrical connector 60 in the axial direction of the rotary shaft 22, instead of doing cumbersome works, such as welding or screw fastening. This therefore facilitates assembly work of the compressor 20.

Therefore, the compressor 20 according to the present embodiment allows an improvement in assembly workability.

According to the compressor 20, the inverter terminal 54 is connected to the inverter circuit 28A, and the bus bar 64 is connected to the conductive pin 42. The inverter terminal 54 is connected to the bus bar 64 via the junction terminal 70. This configuration simplifies the connection structure connecting the inverter circuit 28A and the conductive pin 42.

Furthermore, according to the compressor 20, the second inverter terminal 77 of the inverter terminal 54 and the second bus bar terminal 68 of the bus bar 64 are fitted into the first female terminal 71 and the second female terminal 72 of the junction terminal 70 in the axial direction of the rotary shaft 22. This allows simplification of the shapes of the first female terminal 71 and the second female terminal 72 of the junction terminal 70, and reduction in the size of the junction terminal 70.

According to the compressor 20, the first bent portion 751 and the second bent portion 752 of the inverter terminal 54 are bent so that the second step portion 74 including the second inverter terminal 77 is lower than the first step portion 73, and the second inverter terminal 77 is therefore closer to the conductive pin 42 than the first inverter terminal 76 to the conductive pin 42. This configuration reduces the distance from the second inverter terminal 77 to the conductive pin 42. This configuration therefore allows a reduction in the length of the bus bar 64 connecting the junction terminal 70 and the conductive pin 42. Accordingly, this configuration allows a reduction in the size of the bus bar 64, and therefore in the size of the accommodation case 62. This is also advantageous in reducing errors in assembly of the bus bar 64 and noise.

According to the compressor 20, the junction terminal 70 is accommodated in the resin case 80, and the tapered surface 88 of the resin case 80 defines the resin-case through hole 86, which faces the second female terminal 72 of the junction terminal 70. This configuration allows the tapered surface 88 to guide the second bus bar terminal 68 of the bus bar 64 along the tapered surface 88, thereby facilitating the insertion of the second bus bar terminal 68 into the resin-case through hole 86. This configuration therefore facilitates the fitting of the second bus bar terminal 68 into the second female terminal 72 in the axial direction of the rotary shaft 22.

According to the compressor 20, the rear surface 83 of the resin case 80 has the recesses 87 each located between the adjacent resin-case through holes 86. The presence of each recess 87 allows an increase in the creepage distance between the second bus bar terminals 68 of the bus bars 64 inserted into the adjacent resin-case through holes 86. This is advantageous in ensuring electrical insulation property between the adjacent second bus bar terminals 68.

According to the compressor 20, the pair of ribs 89 is formed on the first upper surface 84 of the resin case 80 and extends in the extension direction of the resin-case through hole 86. This configuration increases the rigidity of the resin case 80 in the extension direction of the resin-case through hole 86. This configuration allows the ribs 89 to receive a contact load even if each of the second bus bar terminal 68 comes into contact with the outer surface of the resin case 80 when the second bus bar terminal 68 of the bus bar 64 is inserted into the resin-case through hole 86, thereby reducing deformation of the resin case 80. This configuration therefore facilitates the insertion of the second bus bar terminals 68 of the bus bars 64 into the resin-case through hole 86 toward the junction terminal 70 and fitting of the second bus bar terminal 68 into the second female terminal 72 in the axial direction of the rotary shaft 22.

According to the compressor 20, the bus bar 64 and the first bus bar terminal 66 connected to the connection end 46 of the conductive pin 42 are accommodated in the accommodation case 62. The second bus bar terminal 68 is connected to the second female terminal 72 in the inverter housing 36. That is, the bus bar 64 and the first bus bar terminal 66 serves as conductors that connect the conductive pin 42 and the second female terminal 72. The bus bar 64 and the first bus bar terminal 66 are disposed outside the housing 30, but accommodated in the accommodation case 62. That is, the bus bar 64 and the first bus bar terminal 66 as conductors are not exposed. This configuration therefore covers the conductor connecting the conductive pin 42 and the second female terminal 72 from damage.

According to the compressor 20, the bus bar 64 has the first bus bar terminal 66 and the second bus bar terminal 68 at the other end and the one end of the bus bar 64, respectively, and is bent into a predetermined shape by edgewise bending and flatwise bending. This configuration allows the first bus bar terminal 66 of the bus bar 64 to be fitted into the connection end 46 of the conductive pin 42, and also allows the second bus bar terminal 68 of the bus bar 64 to be fitted into the second female terminal 72 of the junction terminal 70 by the movement of the electrical connector 60 in the axial direction of the rotary shaft 22.

According to the compressor 20, the motor housing 34 and the inverter housing 36 are arranged side by side in the radial direction of the rotary shaft 22. This configuration prevents an increase in the size of the compressor 20 in the axial direction of the rotary shaft 22, compared to a configuration in which the motor housing 34 and the inverter housing 36 are arranged side by side in the axial direction of the rotary shaft 22. This configuration allows reduction of overlapping between the inverter housing 36 and the bottom wall 34B of the motor housing 34 in the axial direction of the rotary shaft 22, thereby preventing an increase in the size of the compressor 20 in the axial direction of the rotary shaft 22, compared to a configuration in which the motor housing 34 and the inverter housing 36 are arranged side by side in the axial direction of the rotary shaft 22. Furthermore, this configuration allows reduction in the protruding amount of the inverter housing 36 from the motor housing 34 in the radial direction of the rotary shaft 22 compared to a configuration in which the motor housing 34 and the inverter housing 36 are arranged side by side in the axial direction of the rotary shaft 22, for example. This suppresses movement of a part of the inverter housing 36 protruding from the motor housing 34 in the radial direction of the rotary shaft 22 while allowing reduction in the size of the compressor 20 in the radial direction of the rotary shaft 22.

Furthermore, the electrical connector 60 and the hermetic terminal 38 are disposed on the bottom wall 34B outside the housing 30 on the one side in the axial direction of the rotary shaft 22. This eliminates the need for the motor housing 34 to have, on the side surface of the motor housing 34, a case connector for connecting the electrical connector 60 and a terminal arrangement portion for arranging the hermetic terminal 38. This minimizes areas with irregular shapes in the motor housing 34 in a cross-section of the motor housing 34 taken along the direction perpendicular to the axial direction of the rotary shaft 22, i.e., the radial direction of the rotary shaft 22, thereby ensuring the airtightness of the motor housing 34 and suppressing noise and vibration.

Furthermore, the high-voltage connector 56 and the communication connector 58 are respectively disposed on the opposite sides of the electrical connector 60 in the direction perpendicular to the axial direction of the rotary shaft 22. This configuration allows the communication connector 58 to be located away from the high-voltage connector 56, thereby reducing the noise from propagating from the high-voltage connector 56 to the communication connector 58.

Furthermore, the high-voltage connector 56 and the communication connector 58 are connected to the extension portion 36B of the inverter housing 36, and the electrical connector 60 is disposed below the extension portion 36B. This configuration eliminates the need to increase the compressor 20 in the axial direction of the rotary shaft 22, even if the electrical connector 60 is disposed outside the housing 30 on the one side in the axial direction of the rotary shaft 22. This configuration therefore allows the compressor 20 to become compact in the axial direction of the rotary shaft 22.

Furthermore, the hermetic terminal 38 disposed on the bottom wall 34B is wholly accommodated in the accommodation case 62, and the airtightness of the accommodation case 62 on the bottom wall 34B is secured by the first seal portion 62C. This ensures the airtightness of the motor chamber 34A with high reliability.

Although the present disclosure has been described based on the above embodiment, the present disclosure is not limited to the above embodiment, and may be modified within the scope of the present disclosure.

For example, according to the compressor 20 of the present embodiment, the second inverter terminal 77 of the inverter terminal 54 is fitted into the first female terminal 71 of the junction terminal 70 in the axial direction of the rotary shaft 22. However, the present disclosure is not limited thereto. For example, the second inverter terminal 77 of the inverter terminal 54 may be fitted into the first female terminal 71 of the junction terminal 70 in the radial direction of the rotary shaft 22.

According to the compressor 20 of the present embodiment, the junction terminal 70 includes the female terminals, and the inverter terminal 54 and the bus bar 64 include the male terminals. However, the present disclosure is not limited thereto. For example, the junction terminal 70 may include male terminals, and the inverter terminal 54 and the bus bar 64 may include female terminals.

According to the compressor 20 of the present embodiment, the first bus bar terminal 66 has an opening into which the connection end 46 of the conductive pin 42 is inserted, and the diameter of the opening of the first bus bar terminal 66 is equal to the diameter of the connection end 46 of the conductive pin 42. However, the present disclosure is not limited thereto. For example, the diameter of the opening of the first bus bar terminal 66 may be greater than the diameter of the connection end 46 of the conductive pin 42. This facilitates the adjustment of the position of the first bus bar terminal 66 relative to the conductive pin 42, thereby improving the assembly workability of the electric compressor.

According to the compressor 20 of the present embodiment, the base portion 62A and the cover portion 62B of the accommodation case 62 are made of a resin. However, the present disclosure is not limited to thereto. For example, the cover portion 62B may be made of metal in order to block electromagnetic noise.

The present disclosure provides the following technical ideas.

Appendix 1

An electric compressor comprising:
a rotary shaft;
a compression unit configured to compress a fluid with rotation of the rotary shaft;
a motor configured to rotate the rotary shaft;
an inverter including an inverter circuit that drives the motor;
an inverter housing accommodating the inverter;
a motor housing having a bottomed-cylindrical shape and accommodating the motor, the motor housing cooperating with the inverter housing to define, radially outside the motor housing, an inverter chamber in which the inverter is accommodated;
a compression unit housing having a bottomed-cylindrical shape and accommodating the compression unit;
a shaft support member disposed between the motor housing and the compression unit housing, the shaft support member cooperating with the motor housing to define a motor chamber in which the motor is accommodated and cooperating with the compression unit housing to define a compression unit chamber in which the compression unit is accommodated, the shaft support member having an insertion hole through which the rotary shaft is inserted, the shaft support member supporting the rotary shaft rotatably;
a conductive pin inserted through a first through hole formed through a bottom wall of the motor housing, the conductive pin being held by the first through hole and electrically connected to the motor;
an inverter terminal having a plate shape, disposed in the inverter housing, and electrically connected to a board of the inverter circuit on which a pattern is formed; and
an electrical connector electrically connecting the conductive pin and the inverter terminal, wherein
the electrical connector includes: a bus bar having a plate shape; a first terminal and a second terminal respectively at opposite ends of the bus bar; and an accommodation case fixed to the bottom wall of the motor housing, the first terminal being connected to the conductive pin outside the motor housing, the second terminal being inserted into the inverter housing, the accommodation case having a second through hole through which the conductive pin is inserted toward the first terminal and accommodating the bus bar such that the second terminal is disposed outside the accommodation case,
a junction terminal is disposed on the inverter terminal and connects the inverter terminal and the second terminal inside the inverter housing, and
the first terminal and the second terminal are respectively fitted into the conductive pin and the junction terminal by movement of the electrical connector in an axial direction of the rotary shaft.

Appendix 2

The electric compressor according to appendix 1, wherein
the inverter terminal has a first inverter terminal and a second inverter terminal respectively at opposite ends of the inverter terminal, and an extension portion located between the first inverter terminal and the second inverter terminal, the first inverter terminal being connected to the pattern, the second inverter terminal being connected to the junction terminal, the extension portion extending so that the second inverter terminal is spaced away from the board, and
the extension portion has a bent portion that is bent so that the second inverter terminal is closer to the conductive pin than the first inverter terminal to the conductive pin.

Appendix 3

The electric compressor according to appendix 2, wherein
the inverter terminal is accommodated together with the junction terminal in a resin case made of resin such that the first inverter terminal is disposed outside the resin case,
the resin case has a resin-case through hole through which the second terminal is inserted toward the junction terminal, and
the resin-case through hole is defined by a tapered surface that gradually reduces an area of an opening of the resin-case through hole in an insertion direction of the second terminal.

Appendix 4

The electric compressor according to appendix 3, wherein
the electrical connector includes a plurality of the second terminals, and the resin case has a plurality of the resin-case through holes,
the resin case has a recess between the resin-case through holes adjacent to each other, and
the recess increases a creepage distance between the second terminals adjacent to each other.

Appendix 5

The electric compressor according to appendix 3 or 4, wherein
the resin case has: a first accommodation portion for accommodating the junction terminal; a second accommodation portion for accommodating the bent portion; and a rib extending from the first accommodation portion to the second accommodation portion in the axial direction of the rotary shaft, and a dimension of the rib in an up-down direction of the electric compressor gradually increases from the first accommodation portion to the second accommodation portion.

The present disclosure may be applicable to an air conditioning device for a vehicle and the like.

What is claimed is:

1. An electric compressor comprising:
a rotary shaft;
a compression unit configured to compress a fluid with rotation of the rotary shaft;
a motor configured to rotate the rotary shaft;
an inverter including an inverter circuit that drives the motor;
an inverter housing accommodating the inverter;
a motor housing having a bottomed-cylindrical shape and accommodating the motor, the motor housing cooperating with the inverter housing to define, radially outside the motor housing, an inverter chamber in which the inverter is accommodated;
a compression unit housing having a bottomed-cylindrical shape and accommodating the compression unit;
a shaft support member disposed between the motor housing and the compression unit housing, the shaft support member cooperating with the motor housing to define a motor chamber in which the motor is accommodated and cooperating with the compression unit housing to define a compression unit chamber in which the compression unit is accommodated, the shaft support member having an insertion hole through which the rotary shaft is inserted, the shaft support member supporting the rotary shaft rotatably;
a conductive pin inserted through a first through hole formed through a bottom wall of the motor housing, the conductive pin being held by the first through hole and electrically connected to the motor;
an inverter terminal having a plate shape, disposed in the inverter housing, and electrically connected to a board of the inverter circuit on which a pattern is formed; and
an electrical connector electrically connecting the conductive pin and the inverter terminal, wherein
the electrical connector includes: a bus bar having a plate shape; a first terminal and a second terminal respectively at opposite ends of the bus bar; and an accommodation case fixed to the bottom wall of the motor housing, the first terminal being connected to the conductive pin outside the motor housing, the second terminal being inserted into the inverter housing, the accommodation case having a second through hole through which the conductive pin is inserted toward the first terminal and accommodating the bus bar such that the second terminal is disposed outside the accommodation case, a junction terminal is disposed on the inverter terminal and connects the inverter terminal and the second terminal inside the inverter housing, and the first terminal and the second terminal are respectively fitted into the conductive pin and the junction terminal by movement of the electrical connector in an axial direction of the rotary shaft.

2. The electric compressor according to claim 1, wherein the inverter terminal has a first inverter terminal and a second inverter terminal respectively at opposite ends of the inverter terminal, and an extension portion located between the first inverter terminal and the second inverter terminal, the first inverter terminal being connected to the pattern, the second inverter terminal being connected to the junction terminal, the extension portion extending so that the second inverter terminal is spaced away from the board, and the extension portion has a bent portion that is bent so that the second inverter terminal is closer to the conductive pin than the first inverter terminal to the conductive pin.

3. The electric compressor according to claim 2, wherein the inverter terminal is accommodated together with the junction terminal in a resin case made of resin such that the first inverter terminal is disposed outside the resin case, the resin case has a resin-case through hole through which the second terminal is inserted toward the junction terminal, and the resin-case through hole is defined by a tapered surface that gradually reduces an area of an opening of the resin-case through hole in an insertion direction of the second terminal.

4. The electric compressor according to claim 3, wherein the electrical connector includes a plurality of the second terminals, and the resin case has a plurality of the resin-case through holes, the resin case has a recess between the resin-case through holes adjacent to each other, and the recess increases a creepage distance between the second terminals adjacent to each other.

5. The electric compressor according to claim 3, wherein the resin case has: a first accommodation portion for accommodating the junction terminal; a second accommodation portion for accommodating the bent portion; and a rib extending from the first accommodation portion to the second accommodation portion in the axial direction of the rotary shaft, and a dimension of the rib gradually in an up-down direction of the electric compressor increases from the first accommodation portion to the second accommodation portion.

* * * * *